Sept. 25, 1962 C. BAUR ET AL 3,055,282
IRIS DIAPHRAGM
Filed Sept. 14, 1959
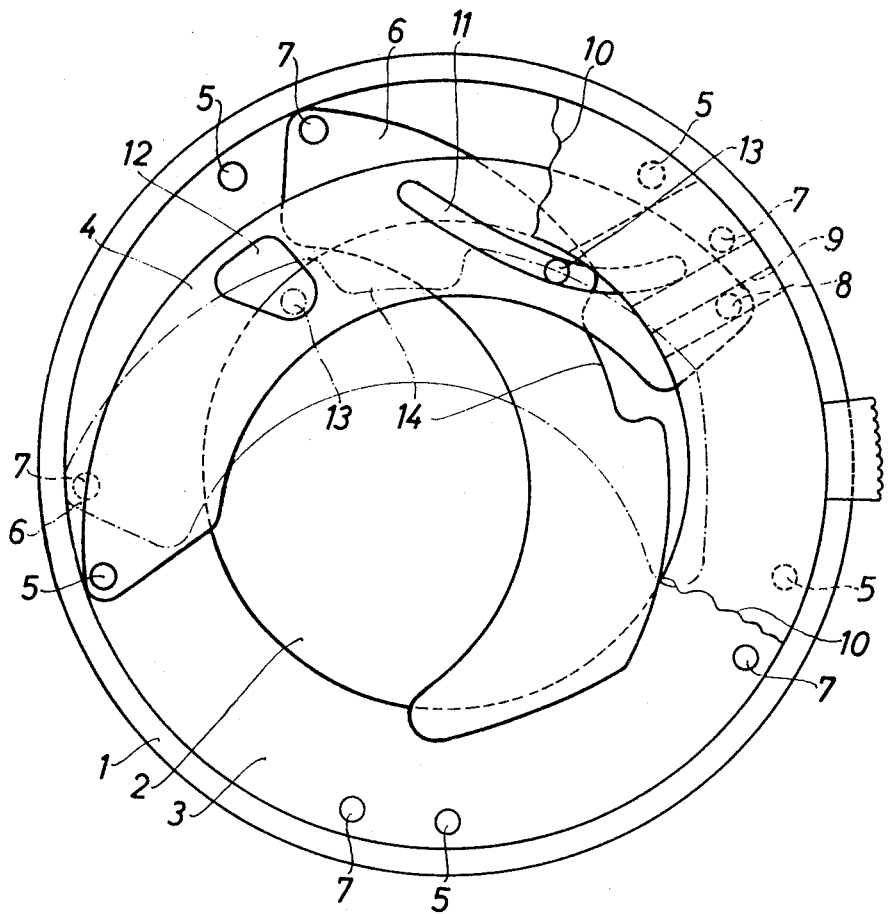
INVENTOR.
CARL BAUR
ERICH BURGER
BY Michael S. Striker
Attorney United States Patent Office 3,055,282
Patented Sept. 25, 1962

3,055,282
IRIS DIAPHRAGM
Carl Baur, Munich-Baldham, and Erich Burger, Munich-Unterhaching, Germany, assignors to Agfa Aktiengesellschaft, Leverkusen, Germany
Filed Sept. 14, 1959, Ser. No. 839,624
Claims priority, application Germany Sept. 22, 1958
9 Claims. (Cl. 95—64)

The present invention relates to diaphragms and in particular to iris diaphragms of the type used in photographic equipment such as cameras for determining the size of the exposure aperture.

Such diaphragms normally include a plurality of turnable diaphragm blades which are respectively turnable about pivot axes which are parallel to each other and parallel to the optical axis, and several diaphragm blades will respectively carry pins which are acted upon for turning the blades respectively about their pivot axes. The distance from the optical axis to the pivot axis of any given blade has with respect to the distance from this pivot axis to the actuating pin which is carried by the blade a predetermined ratio which is known as the crank ratio of the diaphragm. The crank ratio determines the accuracy of the diaphragm, and the smaller the crank ratio the greater the accuracy with which the diaphragm operates. A second ratio which is characteristic of diaphragms indicates the space requirements thereof. Thus, these diaphragms are usually located in shutter housings, and the ratio of the inner radius of the shutter housing to the radius of the maximum aperture which can be provided by the diaphragm indicates the space requirements of the particular diaphragm. From these two ratios it is possible to arrive at a characteristic number which indicates the relative space requirement and which will provide for a given type of diaphragm, a typical, almost constant value where the same advantageous use will be made of the available space independently of the absolute space requirement of the particular diaphragm.

Conventional diaphragms of the type discussed above suffer from the disadvantage that where there are only limited space accomodations the crank ratio is extremely great so that the accuracy of the diaphragm is quite low.

One of the objects of the present invention is to provide a diaphragm of the type referred to above wherein the crank ratio is maintained at an extremely low value heretofore unobtainable for the space in which the diaphragm of the invention is located.

It is also an object of the present invention to provide a diaphragm where an extremely large maximum aperture can be provided for a relatively small housing in which the diaphragm is located without causing the accuracy of the diaphragm to suffer on this account.

It is also an object of the present invention to provide a diaphragm construction of the above type which is composed of simple rugged elements which are very reliable in operation.

With the above objects in view the present invention includes in an iris diaphragm an aperture blade means which determines the size of the aperture for the diaphragm and a control blade means forming a system entirely independent of the system formed by the aperture blade means and cooperating with the aperture blade means to control the position of the latter.

The novel features which are considered as characteristic for the invention are set forth in particular in the appended claims. The invention itself, however, both as to its construction and its method of operation, together with additional objects and advantages thereof, will be best understood from the following description of the specific embodiment when read in connection with the drawing which accompanies this application, this drawing showing the blade arrangement of the diaphragm of the invention and omitting several of the blades for the sake of clarity.

Referring to the drawing, the diaphragm of the invention is located within a shutter housing 1 having a predetermined inner radius referred to below. A stationary ring 3 serves as a support for the blades of the diaphragm, and the inner diameter of the stationary ring 3 determines the size of the maximum aperture 2 of the diaphragm. A part of the diaphragm of the invention is formed by a control blade means, and this control blade means includes a plurality of blades 4 one of which is illustrated in the drawing. The stationary ring 3 together with the pins 5 fixedly carried thereby forms a means which supports the blades 4 of the control blade means for respective turning movement about parallel pivot axes which are parallel to the optical axis. Thus, it will be seen that the blade 4 shown in the drawings is pivotally supported by the left pin 5 of the drawing, and in the same way the additional blades 4 of the control blade means are respectively turnably supported by the several pins 5 illustrated in the drawing.

In addition to the control blade means the diaphragm of the invention includes an aperture blade means which determines the size of the aperture and which is controlled by the control blade means, and this aperture blade means is formed by a plurality of blades 6 one of which is shown in solid lines in the drawing and a second one which is shown in dot-dash lines. The stationary ring 3 also fixedly carries a plurality of pivot pins 7 which with the ring 3 form a means for pivotally supporting the several blades 6 of the aperture blade means for respective turning movement about parallel pivot axes which are parallel to the optical axis, and as may be seen from the drawing the several pins 7 respectively support the several blades 6 for turning movement, and is also evident from the drawing, the several blades 6 determine the size of the aperture.

A rotary adjusting ring means is provided for actuating the control blade means formed by the blades 4, and this rotary ring means includes a ring 10 which is turnably supported by the shutter housing and which has an unillustrated extension extending outside of the housing and available through a suitable linkage or directly to the operator so that the operator can turn the ring 10 to a desired angular position which will give the desired aperture, as will be apparent from the description that follows. The ring 10 is formed with a plurality of grooves 9 in which a plurality of pins 8 are respectively located, and these pins are respectively fixed to the blades 4 adjacent the outer free ends of the latter, so that turning of the ring 10 will result in turning of the blades 4 respectively about the pivot axes determined by the pins 5.

Each of the blades 4 is formed with an arcuate slot 11 and with a cutout 12 as shown on the blade 4 which is illustrated in the drawing. The several blades 6 which form the aperture blade means respectively carry pins 13, and each pin 13 extends through a cutout of one blade 4 into the arcuate slot 11 of the next blade 4. The number of blades 4 are equal to the number of blades 6 so that for each blade 6 there is a blade 4 cooperating therewith to control the position thereof, and the intermediate blade 4 formed with the cutout 12 and located between the cooperating blades 4 and 6 does not in any way interfere with the actuation of a blade 6 by its control blade 4. Each of the aperture blades 6 is formed along its outer peripheral edge with a notch 14 in which a pair of adjacent pivot pins 5 and 7 are located when the diaphragm is set at its maximum aperture, so that the pins 5 and 7 do not interfere with the movement of the blades at large apertures.

When the operator turns the adjusting ring 10 around the optical axis, the grooves 9, which extend radially with respect to the optical axis, also turn and thus the pins 8 are acted on to turn the several blades 4 respectively around the pivots 5. Because of the pin-and-slot connections 13, 11 between the blades 6 and the blades 4, respectively, the aperture blades 6 are turned by the blades 4 when the latter turn and these blades 6 respectively turn about the pivot pins 7 so as to increase or decrease the size of the aperture.

A particular advantage of the structure of the iris diaphragm of the invention resides in the fact that the distance of the actuating pin 13 of each aperture blade 6 from the pivot pin 7 thereof can be made extremely large, so that in this way it is possible to provide an extremely small crank ratio. In this way the accuracy of the diaphragm operation is increased. This increase in accuracy is made possible as a result of the fact that at small apertures of the diaphragm the several pins 13 are located at a radial distance from the optical axis which is smaller than the radius of the maximum aperture 2. The diaphragm is illustrated in such a position in the drawing. This location of the pins 13 at radial distances from the optical axis smaller than the radius of the maximum aperture 2 when the diaphragm is set to provide relatively small apertures not only provides a high degree of accuracy in the operation of the diaphragm, but in addition it makes it possible to provide an extremely large maximum aperture 2 while at the same time providing an extremely compact construction, which is to say a relatively small diameter for the housing 1. With the structure of the invention it is possible to provide a crank ratio which is smaller than 1.5, preferably approximately 1.27, where the ratio of the inner radius of the housing 1 to the radius of the maximum aperture 2 is preferably 1.55 and a maximum of 1.8. With space requirements indicated by the latter ratios, it has not been possible heretofore to provide the small crank ratios which can be provided with the structure of the invention. In other words, it has not been possible with diaphragm of the type illustrated to provide a ratio between the inner radius of the housing and the radius of the maximum aperture 2 of the small value which can be provided with the structure of the invention. Thus, with the structure of the invention it becomes possible to locate in a given space a diaphragm having a crank ratio much smaller than a conventional diaphragm located in the same space, and at the same time it is possible to provide for a shutter housing of an inner given radius a maximum aperture of a much greater size than has hitherto been possible without in any way detracting from the accuracy of operation of the diaphragm.

As is evident from the drawing, at relatively small apertures, the blades 4 serve the additional function of closing, in a light-tight manner, spaces which form between the blades 6.

It will be noted that whenever the diaphragm of the invention provides an aperture, which is to say when the diaphragm of the invention is in open position, the size of this aperture is determined in its entirety by one of the blade means, namely the blade means formed by the plurality of blades 6 whose positions are determined by the control blade means formed by the plurality of blades 4.

It will be understood that each of the elements described above, or two or more together, may also find a useful application in other types of diaphragms differing from the types described above.

While the invention has been illustrated and described as embodied in iris diaphragms, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an iris diaphragm, in combination, a pair of diaphragm blade means, one of said blade means determining by itself the size of the entire aperture of the diaphragm in an open position thereof and the other of said blade means cooperating with said one blade means for controlling the position thereof said other blade means locating said one blade means closer to the optical axis than said other blade means, except in the region of the largest aperture of the diaphragm.

2. In an iris diaphragm, in combination, aperture blade means determining by itself the entire aperture of the diaphragm in an open position thereof; control blade means cooperating with said aperture blade means for controlling the position of the latter; and a rotary adjusting ring means cooperating with said control blade means for actuating the latter, said ring means moving said control blade means from the position where said control blade means locates said aperture blade means to provide approximately the largest aperture of the diaphragm toward the optical axis by a distance less than that through which said control blade means moves said aperture blade means toward the optical axis, when said ring means is turned to provide an aperture substantially smaller than the largest aperture of the diaphragm, and said control blade means locating said aperture blade means closer to the optical axis than said control blade means except in the region where said aperture blade means provides the largest aperture of the diaphragm.

3. In an iris diaphragm, in combination, aperture blade means determining by itself the entire aperture of the diaphragm in an open position thereof and including a plurality of turnable blades and a plurality of pins respectively carried by the latter blades; control blade means cooperating with said aperture blade means for controlling the position of the latter, said control blade means including also a plurality of turnable blades and a plurality of pins respectively carried by the latter blades; and rotary ring means cooperating with the pins of the blades of said control blade means for actuating said control blade means, the blades of said control blade means cooperating with the pins carried by the blades of said aperture blade means for turning the latter blades from the position of widest aperture toward the optical axis by angles greater than the angles through which the blades of said control blade means are turned by said ring means toward the optical axis from said position of widest aperture, and the blades of said control means locating the blades of said aperture blade means closer to the optical axis than the blades of said control blade means except in the region where said blades of said aperture blade means provide the largest diaphragm aperture.

4. In an iris diaphragm, in combination, aperture blade means determining by itself the size of the entire aperture of the diaphragm in an open position thereof; and control blade means cooperating with said aperture blade means for controlling the position of the latter, said control blade means and said aperture blade means each including a plurality of blades and the number of blades of said control blade means being equal to the number of blades of said aperture blade means and the blades of said control blade means respectively cooperating with the blades of said aperture blade means, said control blade means locating said aperture blade means closer to the optical axis than said control blade means itself except in the region of the widest aperture of the diaphragm.

5. In an iris diaphragm, in combination, aperture blade means determining the size of the aperture of the diaphragm in an open position thereof, said aperture blade means including a plurality of blades; stationary ring means pivotally supporting the latter blades for respective turning movement around a plurality of parallel axes which are parallel to the optical axis; and control blade means cooperating with said aperture blade means for controlling the position of the latter, said control blade means including a plurality of blades also pivotally supported by said stationary ring means for respective turning movement around parallel axes which are parallel to the optical axis, said control blade means locating said aperture blade means closer to the optical axis than said control blade means itself except in the region of the widest aperture of the diaphragm.

6. In an iris diaphragm, in combination, aperture blade means determining by itself the size of the entire aperture of the diaphragm in an open position thereof; control blade means cooperating with said aperture blade means controlling the position of the latter, said control blade means including a plurality of blades and a plurality of pins respectively carried by the latter blades, said control blade means locating said aperture blade means closer to the optical axis than said control blade means itself except in the region of the widest aperture of the diaphragm; and rotary adjusting ring means formed with a plurality of grooves in which said pins are respectively received for actuating said control blade means upon turning of said ring means.

7. In an iris diaphragm, in combination, control blade means including a plurality of turnable blades each of which is formed with an arcuate slot; and aperture blade means determining the aperture of the diaphragm in an open position thereof and controlled by said control blade means, said aperture blade means including a plurality of turnable blades respectively carrying pins which respectively extend into said slots, the blades of said control blade means acting at said slots thereof on said pins to control the aperture blade means, said control blade means locating said aperture blade means closer to the optical axis than said control blade means itself except in the region of the widest aperture of the diaphragm.

8. In an iris diaphragm, in combination, a plurality of blades determining the aperture of the diaphragm; means supporting said blades for respective turning movement around parallel pivot axes which are parallel to the optical axis; and a plurality of pins respectively carried by said blades to be acted upon for respectively turning said blades around said pivot axes, the distance from the optical axis to each of said pivot axes having a ratio with respect to the distance between the pivot axis of each blade and the pin carried thereby which is smaller than 1.5 where the ratio between the inner radius of a shutter housing in which the blades are located and the radius of the largest aperture of the diaphragm is a maximum of 1.8.

9. In an iris diaphragm, in combination, a plurality of diaphragm blades determining the aperture of the diaphragm and said blades respectively carrying pins which are acted upon to position said blades; a shutter housing having a predetermined inner radius; and means carried by said shutter housing and supporting said blades for respective turning movement about pivot axes which are parallel to the optical axis, the distance from the optical axis to each pivot axis having with respect to the distance from the pivot axis of each blade to the pin carried thereby a ratio of approximately 1.27 where the ratio of said inner radius of said shutter housing to the radius of the maximum aperture opening is approximately 1.55.

References Cited in the file of this patent

UNITED STATES PATENTS

| | | |
|---|---|---|
| 1,483,465 | Marks | Feb. 12, 1924 |
| 2,913,972 | Cade et al. | Nov. 24, 1959 |